(12) United States Patent
Teuton et al.

(10) Patent No.: US 10,270,787 B2
(45) Date of Patent: Apr. 23, 2019

(54) METHOD FOR SECURING A NETWORK USING CYBER ECONOMIC NETWORK TRANSACTION SECURITY (CENTS)

(71) Applicant: BATTELLE MEMORIAL INSTITUTE, Richland, WA (US)

(72) Inventors: Jeremy R. Teuton, Pasco, WA (US); Jeromy M. Markwort, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 513 days.

(21) Appl. No.: 15/161,938

(22) Filed: May 23, 2016

(65) Prior Publication Data
US 2017/0339170 A1 Nov. 23, 2017

(51) Int. Cl.
*H04L 29/06* (2006.01)
*G06Q 40/02* (2012.01)

(52) U.S. Cl.
CPC ......... *H04L 63/1416* (2013.01); *G06Q 40/02* (2013.01); *H04L 63/1441* (2013.01); *H04L 63/20* (2013.01)

(58) Field of Classification Search
CPC ...... H04L 63/1416; H04L 63/20; G06Q 40/02
USPC .................... 713/150–155; 726/2–7
See application file for complete search history.

(56) References Cited

U.S. PATENT DOCUMENTS

| | | | |
|---|---|---|---|
| 9,794,797 B2 * | 10/2017 | Hoffberg | H04W 16/28 |
| 9,870,562 B2 * | 1/2018 | Davis | G06Q 20/02 |
| 9,875,510 B1 * | 1/2018 | Kasper | G06Q 40/12 |
| 2015/0170112 A1 * | 6/2015 | DeCastro | G06Q 20/381 |
| | | | 705/39 |
| 2015/0324768 A1 * | 11/2015 | Filter | G06Q 20/36 |
| | | | 705/38 |
| 2015/0348017 A1 * | 12/2015 | Allmen | G06Q 20/367 |
| | | | 705/76 |
| 2016/0098723 A1 * | 4/2016 | Feeney | G06Q 20/4016 |
| | | | 705/75 |
| 2016/0098730 A1 * | 4/2016 | Feeney | G06Q 30/0185 |
| | | | 705/71 |
| 2016/0148198 A1 * | 5/2016 | Kelley | G06Q 20/3678 |
| | | | 705/69 |
| 2016/0162897 A1 * | 6/2016 | Feeney | G06Q 20/4014 |
| | | | 705/71 |
| 2016/0189127 A1 * | 6/2016 | Amarnath | G06K 19/06037 |
| | | | 705/18 |
| 2016/0234026 A1 * | 8/2016 | Wilkins | G06F 21/64 |
| 2016/0342994 A1 * | 11/2016 | Davis | G06Q 20/027 |
| 2017/0013000 A1 * | 1/2017 | El-Moussa | H04L 63/1408 |
| 2017/0032365 A1 * | 2/2017 | Liberty | G06Q 20/3678 |
| 2017/0103394 A1 * | 4/2017 | Colhoun | G06Q 20/401 |
| 2017/0221059 A1 * | 8/2017 | Sethi | G06Q 20/405 |
| 2017/0249606 A1 * | 8/2017 | Pirooz | G06Q 40/02 |
| 2017/0279818 A1 * | 9/2017 | Milazzo | H04L 63/1416 |
| 2017/0310747 A1 * | 10/2017 | Cohn | H04L 67/1068 |

(Continued)

*Primary Examiner* — Lynn D Feild
*Assistant Examiner* — Viral S Lakhia
(74) *Attorney, Agent, or Firm* — Colby Nipper PLLC

(57) ABSTRACT

A method and system for administering an interactive computer network and more particularly to performing security in a network of interactive electronic components, such as a computer network using a currency-based transactional economy model where scarcity serves as a limiting factor to accessing and engaging in various activities within the system.

20 Claims, 3 Drawing Sheets

(56) References Cited

U.S. PATENT DOCUMENTS

2018/0115567 A1* 4/2018 El-Moussa .......... H04L 63/1416
2018/0227293 A1* 8/2018 Uhr ....................... G06Q 20/36

* cited by examiner

METHOD FOR SECURING A NETWORK USING CYBER ECONOMIC NETWORK TRANSACTION SECURITY (CENTS)

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

BACKGROUND OF THE INVENTION

Field of the Invention

The invention generally relates to cyber security and more particularly to methodologies for identifying cyber intrusions and quarantining them to avoid damage.

Background Information

Today's cyber security professionals are challenged with trying to understand and secure a complex, fast moving and changing environment. In the physical world the impact of a malicious actor is limited by time, space and resources, but in the cyber world an attacker can launch an attack from the other side of the world and move the data faster than they could if they were stealing a physical product. Once a breach occurs and an outsider has control of an endpoint inside of the network, most intrusion prevention software solutions are reduced in value. A major concern in cyber security is the "insider threat" from the lowest level of careless accidental damage to the professional insider; what is often missed in these discussions is that once a skilled outsider has successfully gained control of an endpoint terminal and its associated credentials within a network this "outsider" is now functionally an "insider" threat with equal potential for damage difficulty in detection. What is needed is a method and system for performing network security that overcomes these disadvantages. The present invention does this.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present invention is a method and system for administering an interactive computer network and more particularly to performing security in a network of interactive electronic components, such as a computer network using a currency-based transactional economy. The network is modeled upon various economic principles and establishes macro, meso and micro economies where transactions between users (who can be individuals, groups of people, networks or functions within the environment) and elements (other users, activities, access, locations or capabilities) require the tendering and receipt of a circulating currency and wherein the scarcity of such a circulating currency prevents a user from accessing various locations or engaging in various activities within the system. A network defender charged with oversight of the process has the ability to view the transactions at any or all of the macro, meso or micro levels (i.e corporation, division, group, individual) and to manipulate various aspects within these economies so as to establish a situation where a user (person, machine, device, network, program, module, API, or other similar entity) on the system cannot do something (access an element) because it cannot provide the sufficient amount of currency to purchase such good, service or access, hence providing an internal stops against abnormal or undesired activities. The control and modification of the economy can occur at any or all of these levels in real time and the purchasing power of a currency for various transactions modified to prevent unwanted access or activity.

The exchange of a circulating currency between users (any person, machine, device, network, business, or other entity that wants to interact within the network) and an element (a good or service, capability, access or thing) enables the operation of the system. Where there is insufficient currency to enable a transaction to take place the transaction fails and the particular function stops. Currency, as described in this application can be any means for facilitating a transfer of value and may include but is not limited to tokens, points, credits, stars, dots or any other item that is assigned an element of value and can be transferred.

In one embodiment of the invention a network having at least one user with an account assigned to it is located within a network made up of a plurality of elements. Each element has a transaction cost assigned to it and the user tenders currency with each element when engagement with a particular activity is desired. When the currency is tendered, the account associated with the user is debited, and if the sufficient amount of currency is tendered the element is made available to the user. If there is an insufficient currency provided the element is not made available and the user is denied access. For example a point of sale device such as credit card reader would only have sufficient currency in its account to process a transaction. It could not send data out of the system. Hence a breach of security into a point of sale location could not serve as a launching point to a larger attack or security breach. Access to the elements and activities can only take place when the proper currency is tendered and a password to such a system or even administrative privileges to the system would not allow that point to go beyond what it is intended to do.

A network defender has the ability to set the quantity, type and quality of the currency both available to a particular user as well the quantity, type and quality of currency required for various elements and can dynamically alter each. In such an arrangement the access of a user to various elements within a system can be selected by outlining the typical quantity and amount of currency allocated to a user for their typical activities. This should work fine for most users and in the event of a stolen password or security breach at login any damage done by a breacher would be limited to the amount of access that the currency on the account allows. A stolen password would not allow widespread access into the system, as each activity has a cost and if the cost cannot be paid the access is denied. In many instances the amount and quantity of currency in an account is based upon the typical activities and behavior of the user. In addition to behavior based rules, specific rules designed by the network defender could also be utilized. Hence the event of a breach at the entry point activities outside of the normal activities of the user would not be allowed. For example, a party who does not send large files out of the network would not have sufficient currency in their account to send large files and would not be able to do so. In addition in the event that the breach is noticed or based upon any other criteria, the network defender can undertake any of a variety of actions such as raising the cost of elements, changing the type of currency required by certain elements, or adding or removing currency from an account or embargoing all access to various functions. This dynamic alteration can take place within the system without the user or breacher being aware of the alteration.

This further allows a series of breadcrumbs or tracking points to be left because the currency exchange at each element can be tracked on the account, while damage to the important portions of the system can be instantly quarantined or embargoed. In addition, rather than requiring a large number of users to change passwords a network defender can work behind the scenes to monitor and track activities looking for abnormalities in spending habits and taking action to prevent abnormal usage while permitting normal usage to take place. If necessary alternative types of currency can be circulated within the system with some elements only accepting certain types of currency.

Interactions with groups of individuals within or without the network can be monitored and coordinated arranged by creating more macroscale models where subsystems of various users and groups of users function under a series of rules and currencies and interact like countries in a greater economic enterprise. In this European Union type of model, various types of currencies are exchanged for services and access, while rules defined by the network defender allow the various subsystems to function within themselves and to interact with one another. These rules could include but are not limited to the placement of taxes, tariffs or embargoes on members or groups of members, the interactions of multiple currencies, differences in exchanges in currencies, all creating differences in how currencies interact, which currencies circulate and what access a particular currency will and will not be able to purchase. Further, unlike standard economic models the present inventions further includes the ability of a network defender to alter the economies by immediately adjust the quantity, quality and amount of currency in circulation as well as to immediately alter the cost for engaging in business with various elements (including subsystems or external systems). This "invisible hand" directing the economy of exchange within the system enables the system to prevent unwanted activities at any of a variety of tiers and contain any damage that could occur based upon an intruder into the system.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

Figure 1:
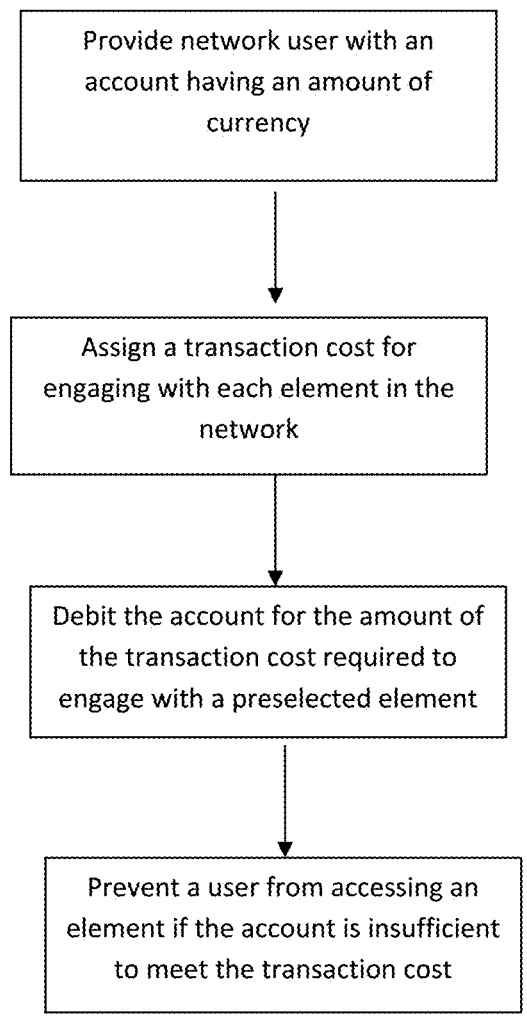
FIG. 1 shows a flow diagram of one embodiment of the present invention

The following pages include descriptions of one embodiment of the present invention. It will be clear from this description of the invention that the invention is not limited to these illustrated embodiments but that the invention also includes a variety of modifications and embodiments thereto. Therefore the present descriptions should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

The present invention is a method for securing a network and foiling adversaries by applying an economic model of currencies, transaction costs and scarcity within the nearly limitless resources of a standard computer system to reduce external and internal attacks to "the speed of work." In one embodiment of the invention described hereafter this process is referred to by the inventors as Cyber Economic Network Transaction Security (CENTS) and is intended to move analysis that is normally tedious, often forensic, to more real-time. By using terms common economic concepts to form a frame work for implementation the described approach is one that provides output is more approachable and actionable, simplifies rule and decision making, an provides a self-limiting response to intrusions and breaches.

In the real world the amount of available funds accessible as cash or through lines of credit both enable and limit activities. For example, a terrorist planning an attack in a city across the country would need enough cash to purchase the tools and supplies. They would also need to be able to pay for travel to get to the other side of the country. Their ability to act would be limited by the amount of cash or credit available. If defenders had a credible intelligence that an attack was imminent and that the attacker still needed to purchase specific supplies and the defenders had the ability to instantly manipulate the currency to be worth ½ of its 'normal' value, or increase the price of specific items or services including travel to and from certain regions or by specific groups, the attacker would now not have the capacity to do what they want to do and the impact of their attack would reduce, or possibly prevented entirely because the bad actor simply cannot "afford to" make the purchases required to complete their preparation activities and travel. The transaction costs are too high.

In the cyber realm an attack happens at the speed of the network and is only limited by the bandwidth, network segmentation and authentication protections in place. Once an account or computer is compromised the attacker is typically able to move data as fast as the network is architected to move it and without limit just like an authorized user. Often the extent of these tragic actions is only discovered well after an attack, during a lengthy forensic investigation.

The preferred embodiment of the invention is an arrangement that is designed to slow an attack to the speed of work. It also allows intuitive understanding and presentation to decision makers of the current state of the organization's network at multiple levels of granularity. By monitoring the amount of currency in circulation, administrators are able to understand the amount of risk in the economy on a moment by moment basis. The amount of currency in circulation is analogous to the attacker being able to buy supplies and a plane ticket. Each person (and even each system) can have a daily 'budget' based on how the work that person or system performs each day. For focused tasks like Point of Sale terminals, or internet of things devices, funds can be restricted tightly and accounts linked to successful completion of their dedicated task, restricted to enough currency to complete one transaction, and credited enough for the next transaction only following a successful transaction. This "Transactional Replenishment" model only allows enough currency to successfully complete one transaction and upon proof of completion credits the account enough for the next.

This model allows for an understanding of how much currency is in circulation and there by an understanding of how many transactions are possible which is synonymous with how much risk is in the network. Imagine if we gave everyone in a company a voucher for $10/day to spend in the break room and they expired at midnight. By looking at the amount of money that has already been taken out of circulation you can understand if you have enough on the shelves to satisfy those who have not spent their money yet. You also know the upper bounds of how much could still be spent and look for behavior that doesn't match the model. For example if you had collected (taken out of circulation) $120 of the $200 given to staff for that day and then you took in an additional $100 or $11 from a single worker, you know that someone is trying to manipulate the economy. You know how much value should be in circulation and you just found an imbalance. Using these techniques administrators can also leverage any information source they trust (notifications from other agencies, the internet, vendors, etc.) to inform how much risk they want to allow in the system and then manipulate the value of the currency in circulation. Additionally knowing which systems and services staff "spends" the most currency on helps prioritize infrastructure maintenance and upgrade. This knowledge also helps judge the potential productively impact if a system fails or the risk a system poses for transmission of malware if compromised.

Using data already in place in most enterprise networks and adding an economic model it is possible to stop many instances of unauthorized access or at least limit them to the "speed of work" by only allowing the attacker to do as much as the person who's account they have compromised normally would normally do in the account cycle. This system also requires the attacker to mimic the normal spend pattern of the account, meaning even an insider using their own account would be detected if they varied from their normal work flow. By leveraging the transactions that already happen in an enterprise and treating it like an economy we can understand where and how much we are spending and enable responders to have a different view of the network, one they are personally familiar with and provide methods to limit risk.

Conceptually speaking the system and process works by visualizing a network (in one example a corporate network) as an economy with its own and manipulating the economy based upon control and action of a currency therein. A network defender can write rules to manipulate the interaction between items and control the economy. By monitoring and controlling the economy, and particularly the flow, quantity and quality of currency within the economy the impact of a compromise can be limited and the environment at the macro and micro economic level can be altered to either target a specific area of concern or easily move through levels of heightened alert and limit even advanced attackers ability to move within the network and exfiltrate data, all with minimal impact to normal productivity. The term currency is used in this method can be any method for demonstrating the transfer of value or serving as a method of exchange. Currencies can include points, tokens, dots, stars, credits or any other item used as a part of a transactional exchange.

While a variety of tools already exist to prevent an initial breach and to detect computer viruses that can facilitate a breach, in the preferred embodiment, the described system and method works in concert with these tools not duplicating, eliminating or interfering with any of their functions. It is also "out of band" meaning it is not a bottleneck or single point of failure. In the described system it is undetectable to attackers and invisible to authorized users during normal work. In its intended embodiment the present invention is a complementary method to limit and police the allowed connections to all points on a network in a manner compatible with current endpoint security that can also enhance behavior monitoring without a significant scalability problem. The system provides a mechanism for the employee to easily access additional endpoints as needed to do their job, while at the same time having a network that is resistant to probing and restricts the access of a malicious user (insider or compromised endpoint). For the majority of users this security will be totally invisible, and when during the course of their work, they run up against its restrictions, the inconvenience is minor and proportional to the risks to network security.

When the network is constructed, a responsible network security manager determines a set of rules and levels of restrictions for every computer resource accessible on the network. Every user starts their work experience on the network with a defined set of end points already approved (1st connection to that point defined as approved when they start work). This set of allowed connections can be a generic set that all employees get, a very restricted set for an employee with a tightly defined role and access to critical information or anything in between. Likewise the computer(s) that employee uses have also been assigned a set of rules and restrictions as a network resource.

In one set of examples each user starts the day with a set amount of currency (possibly of more than one quality) in an access account. The amount and quality of this currency is defined by the network administrator and may be adjusted. This account is reset periodically (minutes, hours or daily or some other interval) with no "savings" or carryover for low usage days. This account is not local, and the user has no direct access. When the user needs to access a network resource they do not currently hold access to, or to use a protocol they do not currently have approved for that resource, they face a challenge to their access account at a minimum. This challenge is a function of the rules and restrictions set for that resource, and happens without the user's notice, and unless the challenge exceeds the remaining value in the user's access account, or the restrictions for that resource include a required challenge to gain access, the user never sees any disruption in their work as the connection is made and the protocol executed. If however, the user's access account balance is insufficient or the resource's access rules preclude the connection, the user could not only be denied access, but could be challenged to continue working on the network. Assuming a successful outcome of the challenge, the user could be allowed access to the resource (again depending on the resource's access rules) and if the challenge was triggered by low balance in the access account, a successful challenge may also increase the balance of the access account. In various embodiments the individual organizations can assign the various rules as to how the individual system would operate. Some might place an affirmative stop. Others send in review of security teams immediately and others may take a wait and see approach. In any instance the system of the present invention allows for monitoring of the activities by tracking the flow of the currency and the interactions with the currency through the system.

A failure of a challenge not only prohibits the requested connection or protocol, but locks the user's account access back to a minimal set (possibly completely), until a proper reactivation protocol is followed (call to support staff, possibly an in person contact). Depending on the desires of the network administration, attempting to access a restricted resource, or failing a challenge could (invisibly to the user) connect to a "honeypot" it is also a possible option to intentionally put resources on the network who's primary function is as a trap, there is no valid reason to access this resource and its rules of access are designed to zero out an access account, or switch the connection to a "honeypot" and report the user's account to security.

The following is a nonexclusive list and short explanation of rules that can be placed on individual network resources, it is important to note that any combination of these rules at any level of severity can be placed on each resource at the administrator/network defender's discretion.

Unregulated: Resource is very commonly used and contains no critical functions (web portal for example). This type of resource is so commonly accessed nothing is gained by tracking. This is not to say that other types of security on this resource should not be left intact. It should also be noted that resources that typically would not have a user and typically would not under normal circumstances initiate any connections would have a special "null" access account and any connection initiated from this class of resource would automatically identify it as compromised.

Charge rates for Access: This resource has a defined charge value to access account. This amount can vary based on the "quality" of the currency. For instance, higher ranked employee or employee with security clearance charged a lesser amount, or there could be a charge rate that only accepts access accounts of employees with security clearance.

By Protocol: Additional or increased charges for protocols deemed to be of higher sensitivity, decided specifically to each resource or as a blanket policy as the administrator chooses.

Time of day: Charge rates can vary by time of day or the resource may simply refuse all connections during non-work hours. This can be a simple denial, a charge to user's access account for the attempt, followed by an information notice that the resource is unavailable, or include a challenge for the attempt. Because users are unaware of the balance in their accounts a resource that charges to the access account and refuses connection could rapidly deplete the access account of a user who "will not take no for an answer". This provides a way to stop an attacker without necessarily having to recognize the repeated attempts as malicious behavior, especially if a dedicated attacker is smart enough to attempt to disguise the attack. This quickly brings a legitimate user into contact with support staff, or at least generates a record for the administrator to consider re-evaluation of the resources rules.

Time out: Connections once purchased have a lifespan, defined by the administrator, and like all rules can be graded by quality of currency used to buy access. At an administrator's discretion re-buying access can be the same price, or at a reduced price based on time from last purchase or time from last use. A connection that is good for a month can be a month from purchase, or once purchased is good for one month from last use. Depending on the value/importance of the resource these rules can be adjusted to optimize the level of security while minimizing the impact to workers.

Rules of the road: While these concepts use a road way analogy it must be remembered that the "rules" apply to the resource as an endpoint, or as a transaction between two endpoints regardless of the path taken to reach that end point unless certain paths of interest are defined (ex. Remote Access). For any given user there will never be a cost savings or increased access to a resource by getting to it via a different path. Previous access concepts, time of day, or challenges can be described as a toll gate. A toll road, beyond the differential charging for different qualities of currency, time of day, and protocol, can restrict speeds based on the quality of currency used to buy access, and charge either to the general account or to a specific quality of currency on a per unit data basis. If a user's job normally requires lots of data transfer their account would have a special quality of currency of an appropriate amount to facilitate this. If a user has medium to minimal need to transfer lots of data they may not have that quality of currency and instead be charged from their general access account currency.

Global charges: During a heightened security risk or detected intrusion, all prices may increase, or accounts may have a set amount deducted. Also an administrator may add a "remote tax" percentage specified globally or only on specific resources. Alternatively the tax may be selectively applied to resources that have never previously been accessed by this user.

Currency limitations: In various embodiments of the invention various economic models and agreed upon mediums of value and methods of exchange are utilized. Various examples of the form of economic exchange could include the following: Cash—The amount each individual person, account, machine, system has to spend on any service is limited to the amount in the account. Credit—The amount each is allowed to spend as a buffer for services needed to smooth the economy (limited and highly monitored) Certified Check—A special case where a specific entity is given value they can spend on any service they need. Gift Certificate—A special case where a specific entity is given value for a specific service that would normally exhaust their budget (limited and highly monitored). Wire Transfer—Value sent between locations (countries or states) to enable specific activities such as snow days when staff work from home and the total amount spent on this service would exceed its normal spend rate. Rain check—IT system down. Gift Card—A special case where a specific entity is given value they can only spend on a specific service. To download monthly patches for example.

Figure 2:
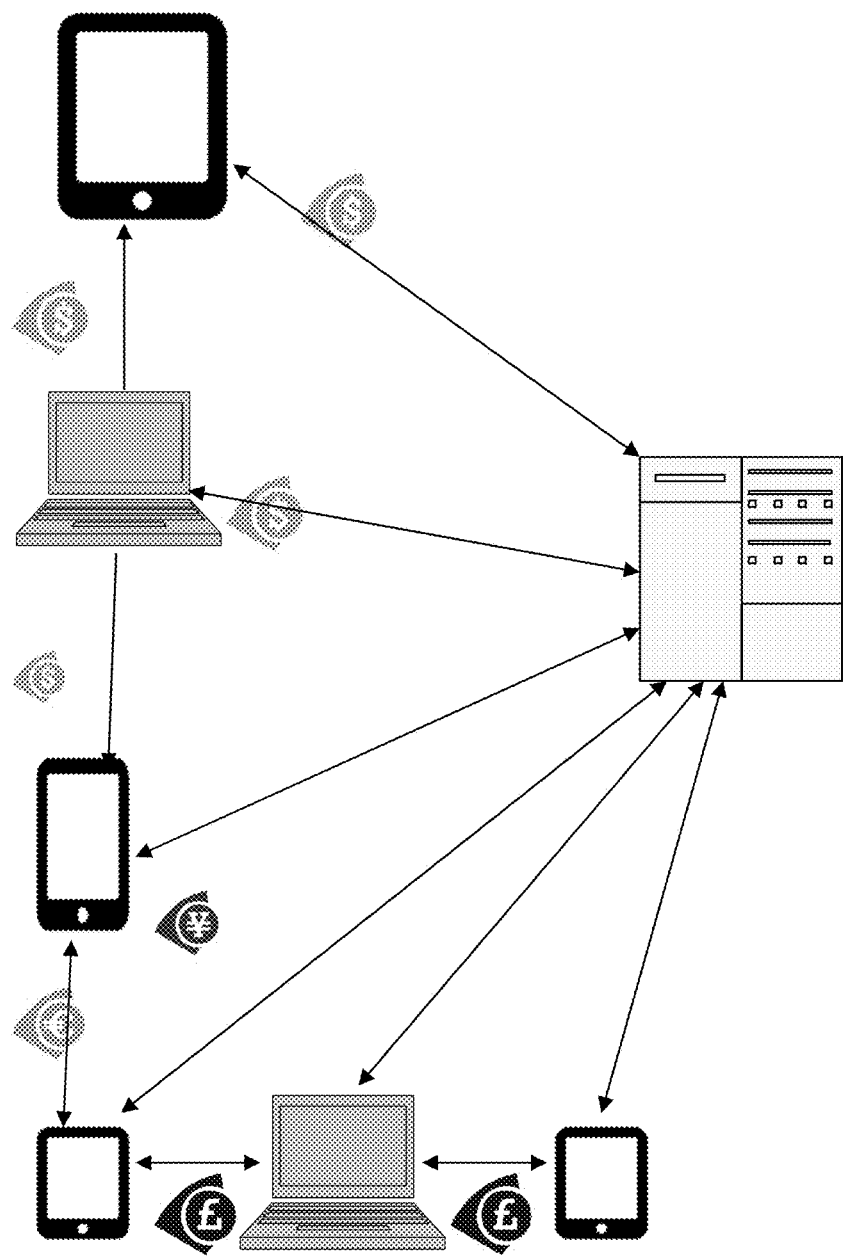
FIG. 2 shows a schematic diagram of one embodiment of the invention.

As shown in FIGS. 1 and 2, in simple terms the present invention functions by turning a network into a closed economy, with a pre-defined currency value in circulation. This model limits the impact of exfiltration to the speed of work, rather than the speed of the network or computing power of the machines involved. Each user is granted currency and each of the system's resources carry defined costs for access and use. The strength of this system is in the scarcity of available currency, as it governs the maximum amount of access/use each user has, with the proper settings a user can perform their task and nothing more without ever noticing the existence of the security. Tuning this type of economy becomes very complex very quickly as every model ever created to charge for a service has an analogy that can be tested in this system. Tuning is critical because the amount of currency in circulation exactly represents the risk in the system. In use a software simulator allows experimental testing of the various charge paradigms both on simple hypothetical networks and then uses a map of a real network and historical network traffic data. This software also becomes a concept demonstration platform, and later becomes a tool both to help a network administrator define their own networks values and to simulate challenges to their individual network in advance, informing proactive measures to keep the system functioning seamlessly.

This model could also inform IT lifecycle decisions focusing replacement dollars on services used, rather than based on a simple aging model (income generated (how much users "paid" to use the service)=top 10 service=replace VS. age >4 years=replace). In one simplified application, a map of an arbitrary small network is presented to the network administrator user who assigns each network resource rules (charging paradigm), and assigns each network work station (assumed to be a single user) a currency balance. After a task list, with the associated costs for each user is calculated, each user's currency balance is adjusted to allow task completion while limiting excess currency at the end of each time interval. Account balances are zeroed and re-set at each time interval, no carry over or savings is permitted. At this point the software should be able to present and validate basic assumptions and demonstrate the relative efficacy of diverse charging paradigms. Adding functionality to the concept demonstrator to make it into an interactive presentation tool that allows live testing of each charging paradigm, and makes the simulator into a game to demonstrate the proposed CENTS system "live".

Figure 3:
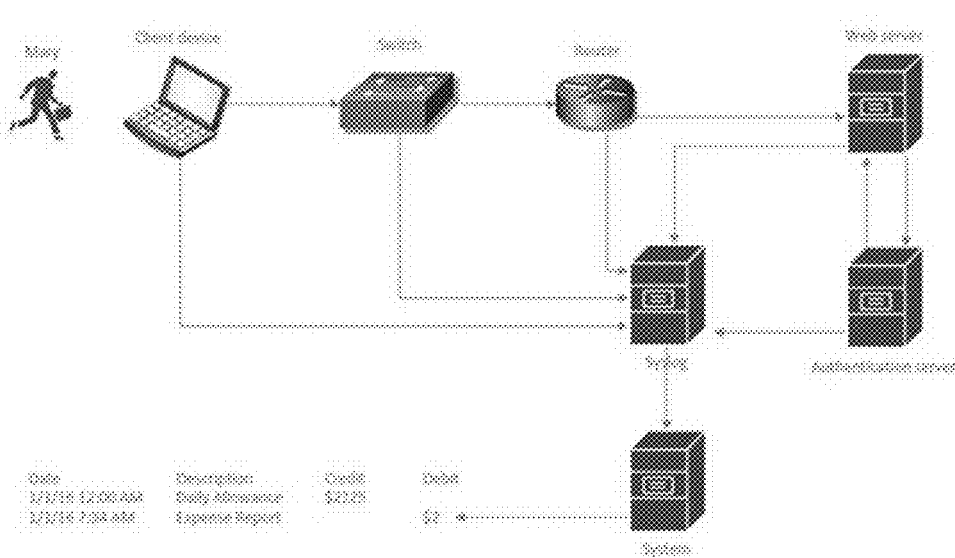
FIG. 3 shows a schematic diagram of one illustrative application of one embodiment of the invention.

Referring now to FIG. 3 an example of the one implementation of the present invention is shown a user wants to view and approve her expense report. She travels 6-12 times a year so this is a common activity. She loads the company's expense reporting system in a web browser authenticates and clicks the "approve" button. When she does this she connects to a switch, her traffic is routed to the network where the web server sits. She authenticates on to the system and does her work. Leveraging technologies such as NetFlow, syslog and other standard protocols we can view this as an economic transaction and these are out-of-band security best practice mechanisms most enterprises will already have in place or could with some effort.
Some of the data that could be used to describe this transaction could be:

| | |
|---|---|
| User | Mary |
| Machine | MyLaptop |
| Service | expense.domain |
| Protocol | HTTPS |
| Src location | User network |
| Dst location | Services network |
| Time | 08:10 |
| Cost | $2 |

With this data we are able to understand the normal services Mary pays for in a given day, week, or even month or year and build a budget for her so we can understand if her spending patterns change or if there's a possibility that her account has been compromised.

In an alternative example Mary's computer has been compromised and the attacker now has a foothold in the corporate network. The next step according to standard prior art protocols such as the MITRE ATT&CK Matrix is to enumerate the network for lateral movement and access to more information and systems. Once Mary's account goes outside her normal spend pattern, burn rate, or her account is exhausted these could raise the issue for an analyst to further investigate. In response, the network defender could set the transaction costs to various elements (activities, goods, services, protocols) within the network in such a way that these new connections have an extremely high cost, or could even require a special type of currency in order to be able to move forward. Compromised computers usually are controlled by remote attackers from the internet. Traffic to and from the internet are treated like trade agreements and tariffs and other controls put in place to adjust cost and control the amount of transactions done on a country by country, or even person by person basis.

By looking at transactions as indicators of work we can start to define and assign costs to them based on how common they are, or probability of an attacker gaining access, or the impact if compromised or any other business rule an enterprise thought valuable. Some examples include: Necessary services: Services like DNS, DHCP, etc. (services used to provide the actual service, but not seen by users) can be assigned costs. Imagine handing someone a $1 each time you looked up the name of a website so that your browser could connect. Basic: user accessing commonly used resources in common ways: While in the office at her desk from her corporate desktop machine. This could be assessed a low cost. First time connection: the first time a connection is built a special cost can be associated to limit reconnaissance; Remote Access: If someone is accessing resources from locations other than campus for example can be treated special and have a higher cost for example. Advanced concept: add a tag to all funds in this account while the connection is remote Remote Access/Foreign Country/or unidentifiable location: Costs can be determined on a country by country basis, or integrations could be made with corporate travel approval systems to account for known travel. Import: As staff access the internet and download software or merely access websites on the internet. Business rules could be written to make these cost more than enterprise sites because they are not controlled and managed by the enterprise. As with Remote access the location of the site could be used as a factor in determining the cost. This model could allow more flexible and granular controls than a simple whitelist for example making services like streaming radio free but it to certain parameters such as quantity or data rate. Export: As staff upload files to the internet these could have an expense appropriate to limit the impact of a compromise. Location can be used to determine cost. Credit card processing/IOS: As already mentioned systems that have tightly limited and defined repetitive tasks can have transactionally replenished accounts where the account is tightly limited to allow just enough activity to complete a single instance of the task, and the account is reset to that amount following successful completion of the task, work is facilitated but any deviation rapidly violates the account limit. Sensitive systems: Extremely high cost, or color of money or no remote access. —Remote Access Tariff flag could be a multiplier to increase cost. Network Port/Protocol: subsets can not only be charged differently, but can also be differentially charged or disallowed by the account and dynamic flags. Toll—For new connections a toll can be charged, for some connections/services this toll can continue to be charged based on amount of data exchanged, or unlimited as desired.

This economy can be manipulated, nearly instantly. The following are some examples of ways an organization can manipulate their economy to meet business objective such as reducing the amount of risk in their enterprise these manipulations can be global, regional or individual: Inflation: If a generic threat is known enterprise could Deduct a certain amount of currency. Deduct a certain percentage of their budget. Deduct a certain percentage of the unspent portion of their budget. Increase the cost of transactions. If the threat is specific, targeted costs such as export (moving data to the internet) could be increased accordingly. Convert all colors of currency held in accounts. All of these actions can be global, focused on specific groups, or specifically applied to individual accounts. Import/Export Tariff—This could allow some use of a site that is not categorized and allow some interaction, but the tariff would make the cost too high for any substantial interactions. Excise Tax: Specific modifiers or multipliers for specific tasks or services/devices cons considered high risk/high value.

By looking at what is happening in our enterprise as financial transactions we are able to understand things like: How much do we normally spend on a specific service (expense.domain, DNS, etc)? What is the total amount spent each day? How much have we spent so far today and how does that compare to our normal burn rate? How much are we importing vs exporting and how does it compare to other time periods? Lifecycle: Are there services lightly tasked or untasked that should considered for retirement, Prioritizing IT investments and retirement. Spend report per account, group, division, or whole company. Variations, even accounts currently within spending limits may be detected by highlighting difference in spending behaviors, including unusual order of operations or unusually fast spend rates for example.

Since this data is available out of band through sources like NetFlow, syslog, authentications, etc users participate in the economy without even knowing. Each day their budget/allowance is credited to their account and as long as they don't spend more than they have in their account no restrictions are seen or enforced. But if someone else tries to use their account in different or higher quantities than they usually do then they would exhaust their medium of exchange and based on the business rules of the organization escalation and actions could be taken. If information becomes available that there is a targeted attack and the likelihood of compromise is high, cyber responders can manipulate the economy to lower the value of exchange to limit the risk.

There are some special and interesting examples where the transactions are extremely predictable which can make this model very effective. Point of sale (POS): Point of sale and other limited function systems can have rules configured to significantly reduce the possibility of significant impact. For example a POS could start each day with a very small budget/allowance, enough to complete one credit card processing transaction for example, but then could be credited for completing the transaction thus replenishing its budget/allowance. If someone tried to move the entire database of credit cards off the POS it would exhaust available funds. This transactional replenishment model can apply to any system with known and limited activities to reduce off-normal behaviors. Patching: When normal patching is needed the account can be credited enough or the transaction, or even a special color of money to be able to complete the transaction. Patch level could also be used to determine costs. For example if a machine doesn't have a required patch business rules could lower the value of its currency thus reducing the risk/impact were it to be compromised. It could also be 'segregated' from other systems by only giving it the color of money to enable the patching or do training for example.

In addition there are variety of other advanced options beyond a simple economy whereby the system can be modified and manipulated to achieve a desired result. Examples include but are not limited to color of money. Accounts can be credited in multiple types or "colors" of currency, specific systems, or services can have color dependent rules: You don't have blue, double charge or zero the account. This can act as a defense in depth, restricted accounts on important machines can also be the only accounts given the specific color of money those services require. Certain services will not allow a transaction to go forward if the proper currency is not provided. This allows a functional segmentation of a network that is invisible to an attacker, allowing flexibility and tight control of the who, when, what and how much individual accounts can do with important services while not requiring highly complex virtual network rules for each account. In some embodiments of the invention the economy can be altered by specialty rules for example: A scheduling module could be utilized wherein vacation schedules, work and training schedules, employee evaluations, physical access logs could be utilized to lock or reduce the currency in a transaction or the access to an element.

EXAMPLES

The following examples provide examples as to how the current application could have interacted to interact and stop two recent security breaches.

Example 1

A simple Google search supplied a great deal of information about how Target interacts with vendors. Including a list of HVAC and refrigeration companies and a detailed case study by Microsoft describing how Target uses Microsoft virtualization software, centralized name resolution and Microsoft System Center Configuration Manager (SCCM), to deploy security patches and system updates. The case study describes the Target technical infrastructure, including POS (point of sale) system information, in significant detail. The compromise of vender systems using a spear phishing email allowed theft of credentials valid on the Target network. From this valid account (equivalent to an insider threat) common network tools were used to do reconnaissance uncovered misconfigured systems. A vulnerable domain controller that could then be used to obtain access to POS systems. Once access was obtained to the necessary systems, malware was installed on point of sale systems. The number of POS machines that were compromised in a short amount of time indicates that the software was likely distributed to them via an automated update process. The malware was installed using SCCM. The malware was custom software, undetectable by virus scanners. The software gathered credit card information from memory as cards were swiped. The data was saved to a .dll file and stored in a temporary NetBios share. Data was moved to drop locations on hacked servers all over the world via FTP. Hackers retrieved the data from drop locations which hackers accessed to retrieve it. While the attack was in progress, monitoring software (FireEye) alerted staff in Bangalore, India. They in turn notified Target staff in Minneapolis but no action was taken. As a result the credit card information for thousands of Target customers was misappropriated.

In the system of the present invention, a similar approach would have been stopped and unable to move forward at several locations. Even with knowledge of the system and compromised password from a vendor. The scope of activities with that compromised password would only allow interaction to the extent that the amount and color of money in that account would allow. A vender's account could be budget and color of money limited to allow only appropriate work. Tolls, limited account balance, differing currencies, increased prices for new connections, or requirements for a special color of money that would quickly be depleted if an attacker attempted to do things other than what the account normally does. This activity could be easily visualized in a way that traditional network protection systems can't. This economic modeling can be used to show the trend of 'new connections' being built compared to the normal burn rate to alert cyber defenders, such charges would quickly deplete an account preforming reconnaissance. Vender accounts might be limited to a specific color of money that limits allowed activity to appropriately restricted assets/services, with all other services charging an infinite amount of this color of money to zero the account the moment it strays for assigned/appropriate tasks. Transfer budgets between devices can be used to alert and stop unexpected transfers like malware to a POS.

For systems with very specific purposes, transactional replenishment could be used to lock them down. For example a POS should do things like looking up inventory and processing credit cards. These systems could have a very small budget, just enough to accomplish one transaction, but once the transaction has been completed they could credit back the amount needed for the next transaction. In this way the credit card database for example could not be moved off the machine because the POS system's budget would be zeroed out. Gift Cards could be issued to POS machines allowing them to spend specified amounts in a specified store (Microsoft's SCCM servers for patching for example) to enable maintenance, but controlling the quantity of exchange. These could also be given a "Not good before/after" date to force use on a specific schedule.

The present system can use any relevant data source useful for quantifying transactions. For example, the method of the present invention can work at both the credential and network level as some vulnerabilities don't rely on credentials. By watching the amount of network traffic between systems the present invention can charge a toll for the connections. In addition it could require a special color of money. If cyber defenders had received information even from a non-IT source like a tip from a colleague they could respond in the same way manipulating the economy and reducing risk. Export/Import Tariffs: the cost to use certain services or transverse 'chokepoints,' like a company's egress to the internet could be manipulated to reduce risk in the economy.

The present invention is not only useful in understanding normal trends and services or accounts that are not within expected limits, but it is also useful and maybe even most useful in responding once a compromise is known. By manipulating the currency companies like Target can use a graded approach in their response. They could raise the cost of export to the point that exfiltration of data was impossible, but still maintain their internal transactions. They could reduce everyone's budget to lower the overall risk profile in their economy.

Example 2

SCADA Power Grid

Internet research on the Ukrainian power grid compromise showed that while generally robust systems were in place a targeted spear phishing e-mail was able to successfully install malware on target machine(s). This established a foothold established in the corporate network. Reconnaissance and lateral movement compromised credentials for remote access to SCADA network. Most of the reconnaissance and pre-positioning of malware was done using stolen VPN credentials, as were the commands that initiated the attack, beyond the initial compromise the threat mirrors an insider threat. Long deep recon of the SCADA networks identified the specific equipment used allowing attackers to write custom malware and plan firmware modifications for their attack including malicious firmware to replace the legitimate firmware on serial-to-Ethernet converters. The attackers then planted firmware on the UPS in the control center enabling them to disable the control center, pushed malware to multiple systems, wiped their Master Boot Record, pushed firmware to the SCADA controller and flipped off circuit breakers to cities and the control center. The country went dark.

In the method and system of the present invention this type of an attack could be thwarted in various ways. By tracking how much is spent on a specific service or specifically how much a certain person spends defenders can understand if what is happening is suspect; an account spending concurrently as remote and local, or making new short term connections (active recon) are suspicious even if the account is within its spending limits. Understanding how much is spent is useful, but also the rate at which it is spent. If the day is half over you would expect somewhere around half of the money had changed hands, but if you are already 90% spent this might warrant investigation. Modifications in the color of money can be used to restrict not just which components can be contacted but limit the amount of data sent in any session. For example, commands to SCADA equipment coming from a limited account that is replenished following each command would allow functional "on/off" type commands unrestricted while seamlessly preventing any unplanned firmware update or malware install the amount of data for a planned firmware update could be facilitated by a 'GiftCard' type transaction.

These example cyber compromises both follow with minor variations the standard attack lifecycle. The approaches described above are easily generalizable to show their ability to interfere with the standard attack lifecycle and are generalizable to a wide variety of situations and circumstances. The present invention utilizes existing information sources and standard technologies to leverage existing information sources and apply well-known principles and practices of economics to cyber security for improved effectiveness and situational awareness. By introducing the concept of scarcity to a nearly limitless medium (the network), the ability exists to reduce the total risk in the system by manipulating its economy. This ability to slow an attack to the "the speed of work", to set up chokepoints to enable and enforce business rules and prevent further intrusion in the event of a breach are key benefits of this invention.

The economic model based upon scarcity of currency enables charging for new connections, access, and capability, much like the cost for building a new road to connect two points, reduces the ability of attacker's ability to reconnoiter an enterprise and move laterally. The model enables new frameworks for discussion and new points for tracking. This in turn enables conversations familiar to cyber and non-cyber staff, encourages IT professionals to think about services as businesses with customers, sales, profit and loss enabling better alignment with the business and how much an organization or individual normally spends on services and use these trends to limit risk. While working alongside existing anti-intrusion products and practices such network segmentation, access controls, and rules based alerting/automated security responses the current invention allows for seamless coordination with existing systems while providing increased network security and flexibility as needed by each user.

Additional, advantages, objects and novel features are described in the other portions of the application and are included in the modifications, alternative constructions, and equivalents falling within the spirit and scope of the invention as defined in the following claims.

What is claimed is:

1. A currency based network security system comprising:
    a network having a plurality of elements including at least one computer, each of the plurality of elements having an assigned transaction cost;
    a pre-defined currency which circulates within the network security system;
    an account assigned to a user having a balance of the pre-defined currency that is debited when the user interacts, via the at least one computer, with an element in an amount equal to the assigned transaction cost assigned to the element, the balance of the assigned account of the user configured to be periodically zeroed and reset to a predetermined amount of the pre-defined currency at a specific time that corresponds to an interval of the periodic zeroing and resetting; and
    a monitor operably coupled with the network that prevents the user from accessing the element or another element of the plurality of elements within the network when the assigned transaction cost of the element or the other element of the plurality of elements is greater than the amount of the pre-defined currency in the assigned account of the user, whereby a scarcity of available pre-defined currency limits access of the user to various ones of the plurality of elements within the network without the user being aware of at least two of: the monitor, the balance of the pre-defined currency in the assigned account, and the assigned transaction cost assigned to each of the plurality of elements.

2. The currency based network security system of claim 1, further comprising a network defender that variably alters the amount of the pre-defined currency assigned to the account assigned to the user.

3. The currency based network security system of claim 1, further comprising a network defender that variably alters the transaction costs assigned to each of the plurality of elements.

4. The currency based network security system of claim 1, wherein the pre-defined includes at least two types of the pre-defined currency are circulated within the network security system.

5. The currency based network security system of claim 1, wherein the predetermined amount of the pre-defined currency assigned to the account is assigned based upon the behavior of the user over a period of time.

6. The currency based network security system of claim 1, wherein the predetermined amount of the pre-defined currency assigned to the account is assigned based upon a series of preset rules.

7. The currency based network security system of claim 1, further comprising a network defender that defines the predetermined amount of the pre-defined currency and quality of the pre-defined currency.

8. The currency based network security system of claim 1, wherein the plurality of elements includes at least two subsystems, each subsystem comprising a plurality of interactive elements that engage in commerce using the pre-defined currency and wherein the at least two subsystems further engage in commerce with each other utilizing the pre-defined currency.

9. The currency based network security system of claim 8, wherein the commerce between the at least two subsystems includes a transactional tariff.

10. The currency based network security system of claim 8, wherein the commerce between the at least two subsystems is subject to embargoes on certain transactions.

11. A method for administering a computer network with a currency based security system, the method comprising:
    providing each user of the computer network with an account that contains a preselected amount of a pre-designated currency that circulates within the security system;
    zeroing a balance of the pre-designated currency in the account and resetting the account with the preselected amount of the pre-designated currency on a periodic basis and at a specific time;
    assigning a transaction cost to each element within the computer network;
    debiting, based on interaction by a user with an element within the computer network, the account of the user for the amount of the transaction cost assigned for interaction with the element; and
    preventing the user or another user from accessing an element within the computer network when the assigned transaction cost for that element is greater than the amount or type of the pre-designated currency in the account of the user or the other user without the users being aware of at least two of: the security system, the balance of the pre-designated currency in the account, and the assigned transaction cost assigned to that element.

12. The method of claim 11, further comprising variably altering the amount of the pre-designated currency assigned to the account of one of the users.

13. The method of claim 11, further comprising variably altering the type of the pre-designated currency assigned to the account of one of the users.

14. The method of claim 11, wherein the transaction cost assigned to each element are variably altered by a network defender of the currency based security system.

15. The method of claim 11, wherein the pre-designed currency includes at least two types of the pre-designed currency that circulate within the security system.

16. The method of claim 11, wherein the preselected amount of the pre-designated currency assigned to an account of one of the users is assigned based upon the behavior of the user over a period of time.

17. The method of claim 11, wherein the preselected amount of the pre-designated currency assigned to the account of one of the users is assigned based upon a series of preset rules.

18. The method of claim 11, wherein the preselected amount of the pre-designated currency assigned to one of the users is fixed to limit the user to engaging in a single function.

19. The method of claim 11, a wherein:
the users are grouped to form micro-economies; and
transactions between micro-entities are subject to a preselected set of rules.

20. The method of claim 1, wherein each user of the computer network is at least one of a network, a person, a computing device, a business, or an entity that interacts with the computer network.

* * * * *